United States Patent
Decker et al.

(10) Patent No.: US 6,316,049 B1
(45) Date of Patent: Nov. 13, 2001

(54) LOW TEMPERATURE EPOXY WRINKLE COATING POWDER

(75) Inventors: Owen H. Decker, Wyomissing; Charles P. Tarnoski; Michele L. Cramer, both of Sinking Spring, all of PA (US)

(73) Assignee: Rohm and Haas Company, Philadelphia, PA (US)

( * ) Notice: Subject to any disclaimer, the term of this patent is extended or adjusted under 35 U.S.C. 154(b) by 0 days.

(21) Appl. No.: 09/477,437

(22) Filed: Jan. 4, 2000

(51) Int. Cl.[7] ............... B05D 3/02; B05D 3/10; B05D 5/00; C08G 59/16; C08G 59/72
(52) U.S. Cl. ............ 427/195; 427/257; 524/904; 525/533; 525/934; 528/91
(58) Field of Search ............. 528/91; 524/904; 525/533; 427/257, 195

(56) References Cited

U.S. PATENT DOCUMENTS

| | | | |
|---|---|---|---|
| 2,824,083 | * 2/1958 | Parry et al. | 528/91 |
| 3,293,322 | * 12/1966 | Pennino | 528/91 X |
| 3,384,610 | * 5/1968 | Lee | 528/91 X |
| 4,341,819 | 7/1982 | Schreffler et al. | 427/195 |
| 5,688,878 | 11/1997 | Decker et al. | 525/533 |
| 5,780,560 | 7/1998 | Decker et al. | 525/533 |
| 5,932,288 | * 8/1999 | Decker et al. | 525/533 X |
| 5,936,057 | * 8/1999 | Baudoul et al | 525/533 X |

FOREIGN PATENT DOCUMENTS

| | | | |
|---|---|---|---|
| 1043998 | * 9/1966 | (GB) | 524/904 |
| 1069438 | * 5/1967 | (GB) | 528/91 |

* cited by examiner

Primary Examiner—Richard D. Lovering

(57) ABSTRACT

Coating compositions comprising an epoxy resin and a curative which is methylenedisalicylic acid and/or a methylenedisalicylic acid ring-substituted homologue are found to cure at and produce a wrinkle finish at relatively low temperatures when a borontrifluoride:amine complex is used as the cure catalyst.

5 Claims, No Drawings

LOW TEMPERATURE EPOXY WRINKLE COATING POWDER

The present invention relates to a coating powder which fuses and cures to form a coating with a wrinkle finish. Fusing and cure proceed at low temperatures making the coating powder suitable for coating heat-sensitive substrates, such as wood.

BACKGROUND OF THE INVENTION

U.S. Pat. No. 4,341,819, the teachings of which are described herein by reference, describes a coating powder which produces a wrinkle finish. The resin of this coating powder is epoxy, the cross-linking agent is methylenedisalicylic acid, and the cure catalyst borontrichloride ethylamine complex ($BCl_3:NH_2Et$). The selection of the methylenedisalicylic acid in this patent as the cross-linking agent is responsible for the wrinkled appearance of the fused and cured coating. Homologues of methylenedisalicylic acid were later found to be suitable, and in some cases preferable, for achieving a wrinkle finish, as described in U.S. Pat. Nos. 5,688,878 and 5,780,560, the teachings of each of which are incorporated herein by reference. Wrinkle finish epoxy resins are also described in U.S. Pat. No. 5,932,288, the teachings of which are incorporated herein by reference.

The coating powders described in the above-identified patents are primarily useful for coating substrates, such as metal, which are not heat sensitive. This is particularly true because in order that these coating powders produce a wrinkle finish, the curing must be conducted at relatively high temperatures, e.g., 375° F. (191° C.) or above.

Wrinkle finishes, such as are produced in the above-referenced patents, may be desired on heat-sensitive substrates, such as wood; wood products, including fiberboard, paper, etc.; and certain plastics. Accordingly, it is a general object of the present invention to provide coating powders which fuse and cure to provide wrinkle finishes at temperatures appropriate for the coating of heat-sensitive substrates.

SUMMARY OF THE INVENTION

It is found that wrinkle finish epoxy coating powders of the type employing an epoxy resin and methylenedisalicylic acid and/or a methylenedisalicylic acid homologue fuse and cure to a wrinkle finish at a substantially lower temperature than prior art compositions if borontrichloride amine complexes are replaced with borontrifluoride amine complexes.

DETAILED DESCRIPTION OF CERTAIN PREFERRED EMBODIMENTS

Herein, unless stated otherwise, all percentages are by weight. The term phr is used in its conventional sense as meaning parts per hundred resin (by weight), the epoxy resin of the compositions described herein being taken as 100 parts and other components being expressed in phr.

The epoxy resins used in the invention include Bisphenol A type epoxies with epoxide equivalent weights of between about 600 and about 2000, or mixtures of such epoxies. Preferably, the major portion, i.e., over about 50% of the epoxy resin, is an epoxy resin with an equivalent weight between about 600 and 1200. Resins sold under the trademarks ARALDITE GT-7013 and GT-7074 by Ciba-Geigy are examples of suitable epoxy resins for this invention.

Based on 100 parts of epoxy resin, the composition of the present invention includes between about 10 and about 20 phr, preferably from about 12 to about 18 phr of methylenedisalicylic acid (MDSA) and/or a MDSA homologue. The MDSA and/or MDSA homolog is generally used at or near stoichiometric levels, the ratio of epoxy groups of the resin to carboxylic acid group of the curative generally being between about 0.5 and about 1.5.

For the purposes of this invention, the term methylenedisalicylic acid (or MDSA) means methylenedisalicylic acid, itself, as well as isomers thereof produced by the sulfuric acid-catalyzed reaction of salicylic acid with formaldehyde, including 3,5-bis[(3-carboxy-4-hydroxyphenyl)methyl]-2-hydroxy-benzoic acid; 5-[3-carboxy-2-hydroxyphenyl)methyl]-3-[(3-carboxy-4-hydroxyphenyl)methyl]-2-hydroxybenzoic acid; 3-[3-carboxy-2 -hydroxyphenyl)methyl]-5-[(3-carboxy-4-hydroxyphenyl)methyl]-2-hydroxybenzoic acid; and 3,5-bis[(3-carboxy-2-hydroxyphenyl)methyl]-2-hydroxybenzoic acid. As so made, methylenedisalicylic acid often contains an unsatisfactorily large amount of residual sulfuric acid, expressed in U.S. Pat. No. 5,780,560 to Decker et al. by a cation to sulfur equivalent ratio of less than about 0.4. It is preferred for the purposes of this invention to use the improved MDSA of U.S. Pat. No. 5,780,560 wherein the cation to sulfur equivalent ratio is greater than about 0.4 and no more than about 3. An even more fully purified MDSA containing no residual sulfur compounds is, of course, more preferred.

For the purposes of this invention, the ring-substituted homolog of MDSA has a structure in general accordance with the following formula:

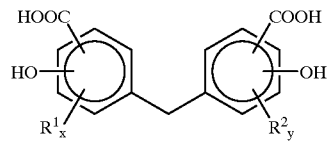

Formula I wherein x and y are independently from 1 to 3, and $R^1$ and $R^2$ are, independently, hydrogen, alkyl groups having from 1 to 20 carbon atoms, aryl groups having from 6 to 10 carbon atoms, or aryl-substituted methylene groups, with the proviso that when x=y=3, $R^1$ and $R^2 \ne$ hydrogen. The methylene bis(alkylsalicylic acid) and other ring-substituted homologs of MDSA are made by the sulfuric acid-catalyzed reaction of formaldehyde with an alkyl- or aryl-substituted salicylic acid and, optionally, a para-hydroxybenzoic acid with or without such ring substituents. It is preferable that the caustic wash of the U.S. Pat. No. 5,780,560 be used so that the cation to sulfur equivalent ratio is greater than about 0.4 [and no more than about 3]. More highly purified homologs are, of course, more preferred. Various techniques can be used to measure the quantities of metal ions and sulfur in MDSA and M3MA samples. One such useful technique is referred to as inductively coupled plasma analysis (ICPA).

A preferred homolog has the structure of Formula I wherein at least one of $R^1$ and $R^2$ is an alkyl group, more preferably, an alkyl group having from 1 to 3 carbon atoms. M3MA is a particularly preferred homolog for the purposes of this invention.

Heretofore, epoxy/MDSA wrinkle finish coating powders utilized $BCl_3$:amine complexes. In accordance with the invention, wrinkle finishes are achieved at substantially lower cure temperatures using $BF_3$:amine complexes as the Lewis acid cure catalyst. $BF_3$:amine complexes are known epoxy cure catalysts, but their use in coating powders of the epoxy/MDSA wrinkle finish variety is heretofore unknown and the benefits achieved by the present invention were not heretofore appreciated. The amine portion of the $BF_3$:amine complex may be primary, secondary, or tertiary (but not ammonia) with the hydrocarbon groups aliphatic or aromatic, cyclic or non-cyclic. The boiling point of the amine portion should be 106° C. (223° F.) or below, preferably 90° C. (194° F.) or below.

$BF_3$:amine complexes are utilized at levels from about 0.5 mmol/100 g resin to about 5.0 mmol/100 g resin, preferably between about 0.8 mmol/100 g resin to about 3.0 mmol/100 g resin.

The use of $BF_3$:amine complexes permits the compositions to be fused and cured at relatively mild conditions of temperature and time and still achieve the desired wrinkled finish. Typical fusing and curing temperatures range between about 250 and about 350° F. (121 to 177° C.) at times of between about 5 and about 20 minutes.

The coating powder compositions of the invention may be clear, i.e., non-pigment-loaded, or may contain from 0 phr up to about 200 phr (though generally 120 phr or less) of filler and/or pigment, relative to the weight of the total of the epoxy-functional resin. The coating composition also may contain conventional additives such as antioxidants, light stabilizers, flow modifiers, and co-stabilizers, generally at a level of about 10 phr or less.

Coating powders in accordance with the present invention can be formed in a conventional manner. For example, the components of the coating composition are combined and blended for about 15 minutes. The blended materials are then extruded, e.g., at 110° C. in a single screw or twin screw extruder, ground and screened to obtain a powder of appropriate particle size. Scalping at 60 mesh is typical to remove coarse particles. Average particle size is typically 20–80 microns. Typically, about 10% by weight of the particles are less than 10 microns. The amount of material retained on a 325 mesh is typically between about 30 and 50 wt. %. The powder is then applied in a conventional manner, e.g., electrostatically, to a substrate. The substrate is heated at the time of application and/or subsequently so that the coating particles melt, form a continuous film, and cure.

Because a wrinkle finish is produced at lower temperature fusing and curing conditions, the coating powder is suitable for coating heat sensitive substrates, such as certain plastics and wood. For purposes of this invention wood is define herein as any lignocellulosic material whether it comes from trees or other plants and whether it be in its natural forms or its fibers have been separated, felted, and compressed to form hardboard, medium density fiberboard, or the like. Particle board, whether standard or treated to enhance its electrical conductivity, and oriented strand board are also within the definition of wood for this invention. Wood having a moisture content of from about 3 to about 10% by weight are most suitable for purpose of this invention.

The present invention is described in further detail in connection with the following examples which illustrate various aspects involved in the practice of the invention. It is to be understood that all changes that come within the spirit of the invention are desired to be protected and thus the invention is not to be construed as limited by these examples.

Catalysts $BCl_3$:$NH_2Et$ Obtained from Ciba as DY9577

$BF_3$:$NH_2Et$ Obtained from Aldrich Chemical Co.

$BCl_3$:$NMe_3$ To a stirred solution of 5.06 g trimethylamine 100 ml heptane at 0° C. was added over fifteen minutes 80 ml of a 1M solution of $BCl_3$ in heptane. A thick white precipitate developed. The suspension was stirred 10 minutes and allowed to warm to room temperature, then evaporated to a crystalline white solid, 14.4 g.

$BF_3$:$NMe_3$ To a stirred solution of 9.4 g trimethylamine in 100 ml heptane at 0° C. was added 20.5 g BF3 etherate. A thick white precipitate developed. The suspension was stirred 10 minutes and allowed to warm to room temperature, then evaporated to a crystalline white solid, 18.3 g.

$BF_3$:$NH_2Me$ To a stirred solution of 8.0 g methylamine in 100 ml ether at 0° C. was added 22.4 g $BF_3$ etherate. The solution was stirred and allowed to come to room temperature. On evaporation, a thick white precipitate developed, which was evaporated to a crystalline white solid, 15.8 g.

$BF_3$:$NH_3$ To a stirred solution of approximately 3 grams of ammonia in 200 ml ether at 0° C. was added 22.4 g $BF_3$ etherate, yielding a clear solution. This was warmed to room is temperature and evaporated to a white crystalline solid, 13.4 g.

$BF_3$:piperidine To a stirred solution of 14.11 g piperidine in 100 ml ether at 0° C. was added 22.4 g $BF_3$ etherate. The solution was stirred 10 minutes and allowed to warm to room temperature, then 100 ml of heptane was added, causing the precipitation of a crystalline solid. This was evaporated to a wet solid, taken up in 100 ml heptane and filtered. The damp solid filtrate was evaporated to a crystalline white solid, 28.7 g.

$BF_3$:hexylamine To a stirred solution of 32 grams of n-hexylamine in 200 ml ether at 0° C. was added 42.1 g $BF_3$ etherate resulting in the precipitation of a white solid. The suspension was stirred 10 minutes and allowed to warm to room temperature, then 100 ml of petroleum ether was added and it was further stirred one hour. The suspension was evaporated to a white, crystalline solid, 51.3 g.

$BF_3$:$NEt_3$ To a stirred solution of 14.05 g triethylamine in ether at 0° C. was added 18.3 g $BF_3$ etherate. The solution was stirred 10 minutes and allowed to warm to room temperature. Evaporation yielded an oil, 21.3 g.

Coatings The activity of each of the catalysts described above was tested in the following standard formulation:

| Component | Parts |
| --- | --- |
| Ciba GT-7013 Bisphenol A Epoxy Resin | 100 |
| Chemicals Inc. Methylenedisalicylic Acid Curing Agent | 16 |
| Estron Resflow P-67 Flow Aid | 1.5 |
| DuPont R-902 Titanium Dioxide Pigment | 5.0 |
| Select Color Products B-28401 Blue Pigment | 3.0 |
| Ferro G-58 Blue Pigment | 0.5 |
| Catalyst | See Table 1. |

Compositions were bag blended and extruded through a 30 mm Baker Perkins twin screw extruder. Extrudate was cooled between chilled rolls to a friable ribbon which was ground to a powder in a hammer mill and scalped at 60 mesh. The powder was applied to 0.032" thick mild steel panels at a coating thickness of between 0.0025 and 0.004" (2.5 to 4 mils) by electrostatic spray. Coated panels were placed in an air-circulating oven for ten minutes at the temperature specified in Table 1. Any surface texture was evaluated visually, and using a gloss meter which measures percent light reflected at an incident angle of 60°. Impact resistance was measured using a half-inch hemispherical tup. Values represent the highest impact which did not produce cracks, tears or delaminations in the coating.

TABLE 1

Cure Temperature and Wrinkle Formation

| Trial | Catalyst | Catalyst (mmol/100 g resin) | Cure Temp (° F.) | Appearance | 60° Gloss | Direct Impact Resistance (Inch-lbs) |
|---|---|---|---|---|---|---|
| 1A | BCl$_3$:NH$_2$Et | 0.9 | 375 | smooth | 67 | 80 |
| 1B | | | 300 | smooth | 102 | F |
| 1C | | | 275 | smooth | 103 | F |
| 2A | | 3.1 | 375 | wrinkle | 2.7 | 160 |
| 2B | | | 300 | smooth | 93 | F |
| 2C | | | 275 | smooth | 100 | F |
| 3A | | 10 | 375 | weak wrinkle | 2.2 | 160 |
| 3B | | | 300 | smooth | 9.6 | 20 |
| 3C | | | 275 | smooth | 95 | F |
| 4A | BF$_3$:NH$_2$Et | 0.9 | 375 | wrinkle | 5.4 | 160 |
| 4B | | | 300 | wrinkle | 2.7 | 40 |
| 4C | | | 275 | smooth | 49 | F |
| 5A | | 3.1 | 375 | texture | 4.6 | 160 |
| 5B | | | 300 | smooth | 27 | 160 |
| 5C | | | 275 | smooth | 47 | F |
| 6A | BCl$_3$:NMe$_3$ | 3.1 | 375 | wrinkle | 0.9 | 160 |
| 6B | | | 300 | weak wrinkle | 13 | F |
| 6C | | | 275 | smooth | 89 | F |
| 7A | BF$_3$:NMe$_3$ | 3.1 | 375 | wrinkle | 1.8 | 160 |
| 7B | | | 300 | wrinkle | 6.5 | 160 |
| 7C | | | 275 | smooth | 28 | 40 |
| 8A | BF$_3$:NH$_2$Me | 1.0 | 375 | wrinkle | 1.9 | 160 |
| 8B | | | 300 | wrinkle | 2.7 | 120 |
| 8C | | | 275 | weak wrinkle | 14 | F |
| 9A | | 3.1 | 375 | low gloss smooth | 3.3 | 160 |
| 9B | | | 300 | smooth | 28 | 120 |
| 9C | | | 275 | smooth | 49 | F |
| 10A | BF$_3$:NH$_3$ | 0.9 | 375 | smooth | 86 | 20 |
| 10B | | | 300 | smooth | 95 | F |
| 11A | | 3.1 | 375 | low gloss smooth | 7.5 | 60 |
| 11B | | | 300 | low gloss smooth | 14 | 80 |
| 11C | | | 275 | smooth | 29 | 80 |
| 12A | BF$_3$:NEt$_3$ | 3.1 | 375 | wrinkle | 3.5 | 160 |
| 12B | | | 300 | weak wrinkle | 15 | 160 |
| 13A | BF$_3$:piperidine | 0.9 | 375 | smooth | 75 | 60 |
| 13B | | | 300 | smooth | 90 | 20 |
| 13C | | | 275 | smooth | 97 | Fail |
| 14A | | 3.1 | 375 | low gloss smooth | 9.6 | 160 |
| 14B | | | 300 | smooth | | |
| 14C | | | 275 | smooth | | |
| 15A | BF$_3$:hexylamine | 0.9 | 375 | smooth | 75 | 60 |
| 15B | | | 300 | smooth | 90 | 20 |
| 16A | | 3.1 | 375 | low gloss smooth | 6.9 | |
| 16B | | | 300 | smooth | | |
| 16C | | | 275 | smooth | | |

Discussion of Results

Lewis Acid and Wrinkle Results in Table 1 show that BF$_3$ produces wrinkle at lower temperatures than BCl$_3$.

Trials 1A–C show that at low levels such as 0.9 mmol/100 g resin of the previously-known catalyst, BCl$_3$:NH$_2$Et, wrinkle is not obtained at normal cure temperatures such as 375° F. or at the lower cure temperature of 300° F. (Minimum cure temperature to obtain wrinkle is historically about 325°).

Trials 2A–C show that BCl$_3$:NH$_2$Et at normal levels of 3.1 mmol give wrinkle at normal cure temperatures but not at 300° F.

Trials 3A–C show that raising the level of BCl$_3$:NH$_2$Et to 10 mmol damages the wrinkle at 375° and does not produce wrinkle at 300° F.

Trials 4A–C show that low levels of the fluorocatalyst BF$_3$:NH$_2$Et give wrinkles at 375° F. or at the lower temperature 300° F.

Trials 5A–C show that at normal catalyst levels of 3.1 mmol, BF$_3$:NH$_2$Et does not produce wrinkle.

Trials 6A–C and 7A–C show again that BF$_3$ catalyst produce wrinkle at lower cure temperature than BCl$_3$ catalysts.

Trials 8A–C and 9A–C show again that some BF$_3$ catalysts must be used at lower levels than BCl$_3$ catalysts are typically used.

Amine and Wrinkle Only certain blocking amines produce wrinkle.

Example 10A–C and 11A–C show that when BF$_3$ is blocked with ammonia, no wrinkle is produced. In contrast, Trials 8A and B show that methylamine is an acceptable blocking agent. Trials 4-A and B, 7A and B, and 12A and B show that amines with up to six carbons are acceptable blocking agents.

Trials 13A–C, 14A–C, 15A,B and 16A–C demonstrate that BF$_3$ complexes of some amines do not produce wrinkle. Data in Table 2 below suggests that there is a correlation between the boiling point of the amine and the ability of its complex to produce wrinkle. Boiling points should be below 106° C. and preferably below 90° C.

TABLE 2

| Amine | Carbons | Boiling Point (° C.) | Wrinkle? |
|---|---|---|---|
| Methylamine | 1 | −6.3 | yes |
| Trimethylamine | 3 | 2.9 | yes |
| Ethylamine | 2 | 16.6 | yes |
| Triethylamine | 6 | 89 | yes |
| Piperidine | 5 | 106 | no |
| n-Hexylamine | 6 | 131 | no |
| Dibenzylamine | 14 | 300 | no |

Cure Temperature and Physical Properties Reasonable cure can be obtained in as little as 10 minutes at 300° F.

As illustrated by the failure to develop impact resistance in trials 1B and C, and 6B and C, state of the art BCl$_3$ catalysts at 3 mmol/100 g resin fail to produce adequate cure at 300° F. or below. At unusually high levels such as the 10 mmol in Trial 3, slight cure is produced at 300° F.

In contrast, all the BF$_3$ complexes which produce wrinkle at 300° F. also produce some cure. This information is collected in Table 3.

TABLE 3

| Amine | Level (mmol/100 g resin) | Cure Temp. (° F.) | Impact Resistance (inch-lbs) |
|---|---|---|---|
| Methylamine | 1.0 | 300 | 120 |
| Trimethylamine | 3.1 | 300 | 160 |
| Ethylamine | 0.9 | 300 | 40 |
| Ethylamine | 3.1 | 300 | 120 |
| Triethylamine | 3.1 | 300 | 160 |

What is claimed is:

1. In a powdered coating composition adapted to provide a wrinkled finish, said composition comprising an epoxy resin; a curing agent according to Formula I,

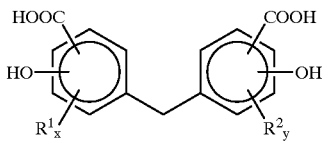

Formula I wherein x and y are independently from 1 to 3, and $R_1$ and $R_2$ are, independently, hydrogen, alkyl groups having from 1 to 20 carbon atoms, aryl groups having from 6 to 10 carbon atoms, or aryl substituted methylene groups, with the proviso that when x=y=3, $R_1$ and $R_2$ are not hydrogen; and a cure catalyst, the improvement wherein said cure catalyst is a $BF_3$:amine complex in which the amine is primary, secondary, or tertiary and has a boiling point of about 106° C. or below.

2. The composition according to claim 1 wherein the amine has a boiling point of about 90° C. or below.

3. A method of obtaining a wrinkle finish on a substrate surface, said method comprising applying onto the substrate surface a coating powder composition comprising an epoxy resin; a curing agent according to Formula I,

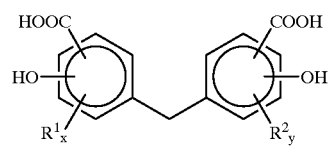

Formula I wherein x and y are independently from 1 to 3, and $R_1$ and $R_2$ are, independently, hydrogen, alkyl groups having from 1 to 20 carbon atoms, aryl groups having from 6 to 10 carbon atoms, or aryl substituted methylene groups, with the proviso that when x=y=3, $R_1$ and $R_2$ are not hydrogen;

and, as a cure catalyst, a $BF_3$:amine complex in which the amine is primary, secondary, or tertiary and has a boiling point of about 106° C. or below, and heating the composition to fuse and cure it.

4. The method according to claim 3 wherein the amine has a boiling point of about 90° C. or below.

5. The method according to claim 4 wherein said substrate is wood.

* * * * *